(12) United States Patent
Seitz et al.

(10) Patent No.: US 11,112,242 B2
(45) Date of Patent: Sep. 7, 2021

(54) LIGHT RECEIVER

(71) Applicant: LEICA GEOSYSTEMS AG, Heerbrugg (CH)

(72) Inventors: Peter Seitz, Urdorf (CH); Thomas Ammer, Widnau (CH); Jürg Hinderling, Marbach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 527 days.

(21) Appl. No.: 15/984,141

(22) Filed: May 18, 2018

(65) Prior Publication Data

US 2018/0335305 A1 Nov. 22, 2018

(30) Foreign Application Priority Data

May 18, 2017 (EP) .................................. 17171832

(51) Int. Cl.
*G01C 15/00* (2006.01)
*G01J 1/42* (2006.01)
*G01C 3/08* (2006.01)

(52) U.S. Cl.
CPC ............. *G01C 15/006* (2013.01); *G01C 3/08* (2013.01); *G01J 1/4257* (2013.01)

(58) Field of Classification Search
CPC ...... G01C 15/006; G01B 11/14; G02B 6/4206
See application file for complete search history.

(56) References Cited

U.S. PATENT DOCUMENTS

| 4,756,617 | A | 7/1988 | Cain et al. | |
| 6,098,483 | A * | 8/2000 | Syamoto | F16H 59/10 |
| | | | | 74/473.12 |
| 6,435,283 | B1 | 8/2002 | Ohtomo et al. | |
| 7,181,856 | B1 | 2/2007 | Hanchett et al. | |
| 7,372,011 | B2 | 5/2008 | Green et al. | |
| 7,394,527 | B2 * | 7/2008 | Essling | G01C 15/002 |
| | | | | 356/4.01 |

(Continued)

FOREIGN PATENT DOCUMENTS

| CN | 1434269 A | 8/2003 |
| CN | 101553707 A | 10/2009 |

(Continued)

OTHER PUBLICATIONS

Extended European Search Report dated Nov. 7, 2017 as received in Application No. 17171832.3.

(Continued)

*Primary Examiner* — Eric L Bolda
(74) *Attorney, Agent, or Firm* — Maschoff Brennan

(57) ABSTRACT

A light receiver designed to determine a position or orientation relative to a reference light wherein the light receiver comprises an elongated rod-shaped light receptor with two ends, a light coupler, a light guide, and light detection means at both ends and a signal processor to process the electric signals of the detection means and to determine the relative position and/or orientation by a comparative evaluation of the electric signals. The light guide serves as a light propagation path of defined length for light coupled into the light guide by the light coupler and the signal processor determines the position and/or orientation based on light propagation speed of the reference light propagating in the light guide.

14 Claims, 5 Drawing Sheets

(56) References Cited

U.S. PATENT DOCUMENTS

| | | | |
|---|---|---|---|
| 8,502,989 B1* | 8/2013 | Rossbach | G01S 5/16 |
| | | | 356/614 |
| 2003/0136901 A1 | 7/2003 | Ohtomo et al. | |
| 2003/0174305 A1* | 9/2003 | Kasper | G01C 15/002 |
| | | | 356/3.09 |
| 2009/0046269 A1 | 2/2009 | Essling | |
| 2010/0253931 A1 | 10/2010 | Meier et al. | |
| 2011/0119937 A1 | 5/2011 | Winistoerfer | |
| 2013/0187033 A1 | 7/2013 | Koeppe | |
| 2014/0204399 A1* | 7/2014 | Dumoulin | G01J 1/4257 |
| | | | 356/623 |
| 2016/0170024 A1 | 6/2016 | Böckem et al. | |

FOREIGN PATENT DOCUMENTS

| | | |
|---|---|---|
| CN | 102607550 A | 7/2012 |
| CN | 103140775 A | 6/2013 |
| CN | 104995482 A | 10/2015 |
| CN | 105699983 A | 6/2016 |
| DE | 19540590 A1 | 4/1996 |
| WO | 2014/126649 A1 | 8/2014 |

OTHER PUBLICATIONS

Thermo Fisher Scientific, Inc., Fluorescent Labeling and Detection, retrieved from: https://www.thermofisher.com/us/en/home/about-us/partnering-licensing/license-our-technology/intellectual-property-licensing/fluorescent-labeling-detection-technology.html (2012), Retrieved on: Jul. 7, 2021.

* cited by examiner

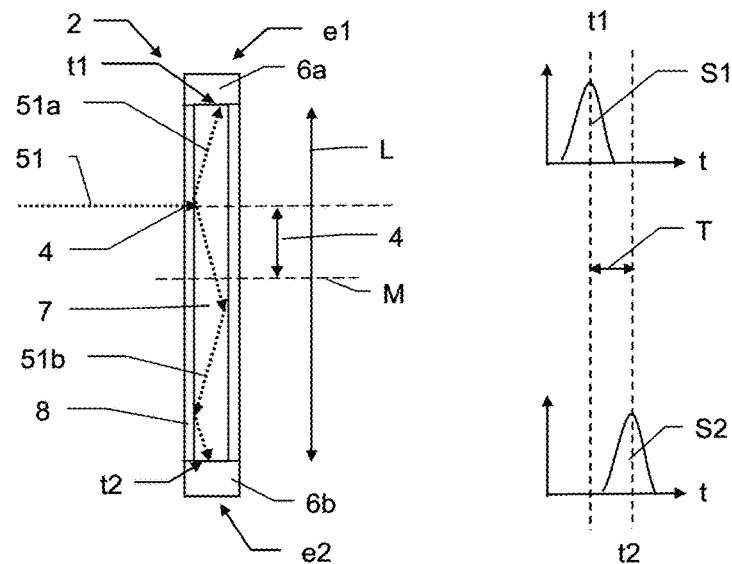
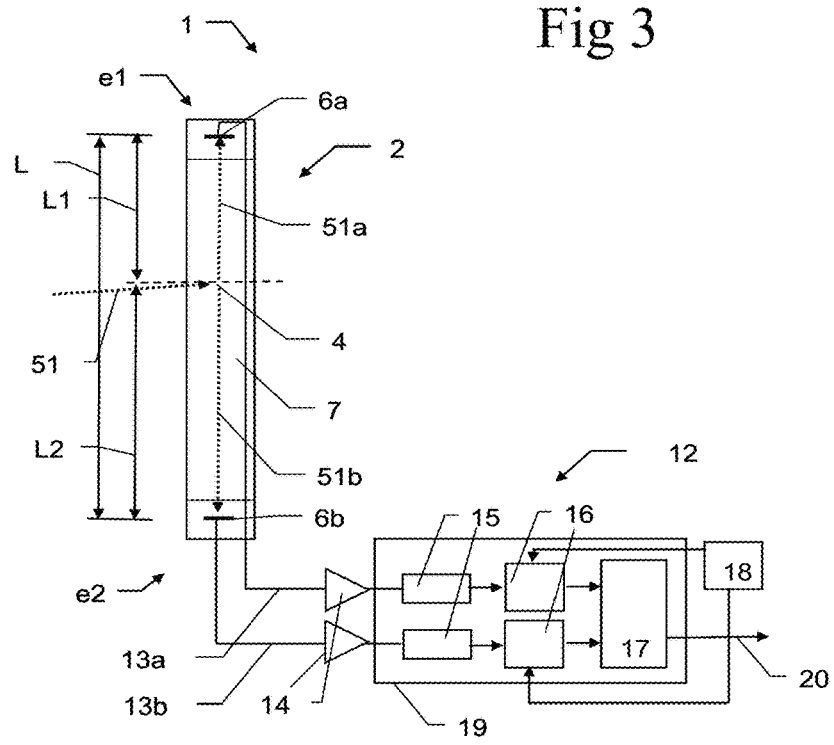
Fig 3
Fig 4a

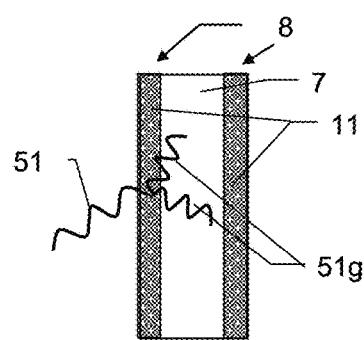
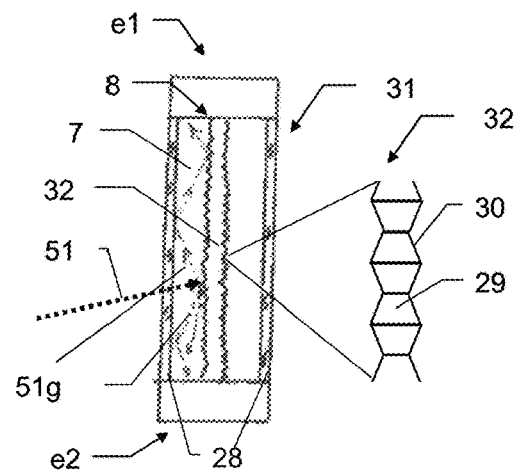
Fig 5c
Fig 5d
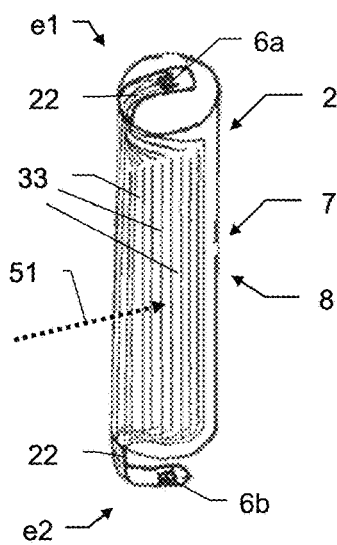
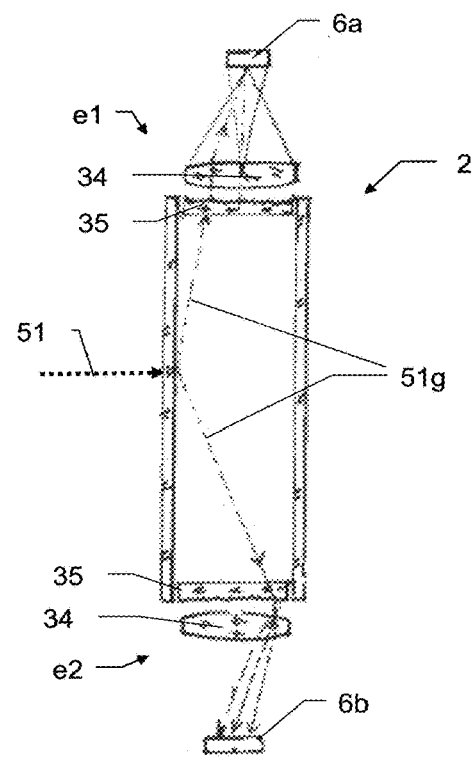
Fig 6a
Fig 6b

LIGHT RECEIVER

CROSS-REFERENCE TO RELATED APPLICATIONS

This application claims priority to European Patent Application No. 17171832 filed on May 18, 2017. The foregoing patent application are incorporated herein by reference.

FIELD OF INVENTION

The present invention relates to a light receiver to determine a position and/or orientation relative to a reference light, a position measuring system, and a position determination method.

BACKGROUND

A measurement task often occurring in practice is the determination of the absolute or relative position in space of a point or an object. This is required, for example in construction work, surveying tasks, building and operation of heavy machinery, or the monitoring of relative displacement in buildings, bridges, tunnels, dams, etc. Traditionally, this measurement problem is solved with known instruments such as levelling boards, surveyor's staffs, measuring rods or rulers. These instruments rely on a human observer to determine the relative position of a reference point or an object with respect to the measurement rod.

This measurement process can be automated with the help of a light-generation device and an active measuring rod, capable of determining the absolute position of the location of incidence of a laser beam or a sheet of light (also called laser levelling). In the technical field of light leveling or positioning, often a laser rotator or a line laser is used to span a leveling plane which can be horizontal, vertical or tilted by a desired angle. The laser plane is detected by a laser receiver, which detects the striking position of the laser inside a detection window to determine the receiver's position relative to the laser plane. The accuracy of position determination has to be in the millimeter range or below, wherein also linearity of the position readout is an important aspect. The sheet of light can be generated, for example, with a laser beam and a cylindrical lens in the path of the laser beam. As said, a laser rotator or a line laser is used to span a leveling plane which can be horizontal, vertical or tilted by a desired angle. The laser plane is detected by the light receiver, which detects the striking position of the laser inside a detection window to determine the receiver's position relative to the laser plane. The detection window, or receiver window, is the area at the light receiver device, which is embodied to detect the light beam, in particular the position of the light beam's striking point within the detection window for determining the relative position of the laser-beam's axis and the receiver device in at least one direction. In many embodiments, the center in the half of the length is the desired level of the laser beam and the receiver indicates a deviation from this ideal position by indicative or quantifying means. The electronic reception of the laser beam allows an extension of the range of the laser leveling, usability under sunlight conditions, etc. Many types of laser receivers are known, with many different functional, performance and cost advantages compared to their competitors. A rotating or scanning laser beam emitter produces a beam that sweeps past the receiver and generates laser pulses of short duration but of high bandwidth in the detection window. In contrast, continuous laser transmitters generate a continuous laser signal of a narrow modulation bandwidth at the modulation frequency. Although the sensor element of the receiver can be the same for both types of laser levels, the signal conditioning and evaluation in the receiver is different.

Some examples of such laser leveling implementations are U.S. Pat. No. 6,435,283 showing a rotating single beam laser transmitter, or U.S. Pat. No. 4,756,617 showing a continuous 360° laser plane generated by directing a laser at a conical surface, wherein typically an amplitude modulated laser source is used. Those two principles of projecting a laser line are also referred to as line lasers with a scanning line or line lasers with a continuous laser line, wherein the light can be modulated.

There are different techniques known to determine the striking position of the light in the receiver window. One approach of determining the position of a light beam is by usage of photodiodes or arrays of photodiodes. U.S. Pat. No. 7,372,011 describes a linear array of (parallel) photodiodes with associated weighting circuits. The weighting circuits are used to determine whether the receiver has been struck by a laser beam or by a strobe light.

DE 19540590 A1 relates to a light receiver for determining a position using the reference light of a laser rotator. The light receiver consists of at least two, preferably three line-shaped separate receiving elements (such as three lines of photo diodes) which are not position sensitive and which are arranged in a defined angular position to each other, for example forming together the shape of the letter "N". The receiving elements each generate signals responsive to the time of a stroke of the rotating reference laser beam which passes the three rods in sequence, whereby these temporal signals due to the non-position-sensitivity are independent of the point of impinging on the respective element. Each detection line shall show the same signal behavior no matter which one of the photo diodes of the line is hit by the reference light. This is the condition that the time difference (or ration of the time durations) measured using the three signals of all three optical receiving units as start and stop signals is indicative of the height in which the laser beam strikes the "N". In other words, the relative timing of the electrical signals generated by the three linear receivers arranged in defined angular position to each other indicate in which height the rotating laser beam sweeps over the N-shaped receiver. However, the light receiver according to DE 19540590 A1 is quite complex and does not satisfy nowaday's precision demands. As a further disadvantage, the size of the light receiver is constrained as the larger the height of the N-shaped device, the longer the line-shaped receiving elements, the higher the electrical noise and the manufacturing costs of the complete device.

U.S. Pat. No. 7,394,527 B2 teaches different measurement principles of an active measuring rod. One preferred method makes use of a tubular light-guide filled with dispersive material, and at both ends of the tubular light-guide a photodetector is placed. Since the dispersive material is coupling more light out of the light guide the longer the distance to a particular photodetector is, a comparison between the signal strengths of the two photodetectors i.e. the amplitude of the light detected provides a measure of the position where the incident light is hitting the tubular light-guide. However, this method has a couple of disadvantages. It works for example only with pulsed light and the principle relies on scattering which means that progressive light loss along the length of the lightguide takes effect which weakens the detectable light, and hence aggravates the signal processing, for example due to a worsened signal-to-noise ratio (SNR).

BRIEF DESCRIPTION

It is therefore an object of some embodiments of the present invention to provide an improved light receiver and an according measuring system for determining a position relative to a reference light.

Some embodiments of the present invention relate to a light receiver designed to determine a position and/or orientation relative to a reference light in form of a free light beam or light fan. "Light" is to be understood not only as light in the visible range, but with shorter or longer wavelengths, too. Preferably, the reference light is generated by a laser source or a SLED. Such a reference light is disclosed for example by M. Winistörfer et al. in US patent application No. 2011/0119937 A1 which discloses a light sheet covering 360 degrees generated with a reference laser beam rotating about an vertical axis. Preferably, the position of the present invention is a vertical offset to a reference plane defined by the reference light.

The light receiver comprises an elongated rod-shaped light receptor with two ends, a light coupler and a light guide. "Elongated rod-shaped" means not necessarily that the light receptor is strictly straight with a longitudinal axis, but comprises convoluted forms, too. Also, the cross section of the light receptor is not necessarily circular. The light receiver further comprises (temporally resolved) light detection means, for example an optoelectronic sensor or photodetector, e.g. a Photomultiplier Tube (PMT), an Avalanche Photo Diode (APD), PIN-Diode or Single Photon Avalanche Diode (SPAD), or Multi-Pixel Photon Counter (MPPC), designed for separate light detection operations at each of both ends of the light receptor and designed to put out electric signals responsive to reference light separately detected at each end of the light receptor. The light detection means are designed for example as light detectors at each end (hence at least two light detectors are present). Alternatively, the light detection means are designed as a single light detector which detects light of the first end and —additionally to and separately of the light detection of the first end—light of the second end, too (e.g. by transferring light received at the second end through a multimode fiber-optics to the detector). Alternatively, an optical reflector device such as a mirror or a retroflector is placed at the second end, thus reflecting the incident light to the first end of the rod, where the detector is placed. Thus, in the second option, one light detector serves for both ends which has some advantages for example regarding fabrication costs and thermalization. The light receiver comprises also a signal processor to process the electric signals of the detection means and determine the relative position and/or orientation by a comparative evaluation of the signals of both ends. In other words, the signal processor handles the detection signals of both sides and compares and correlates them.

The light coupler and the light guide are designed to receive and conduct at least part of the reference light impinging on the light receptor towards both ends such that impinging reference light is detectable by the detection means at both ends. With other words the reference light strikes the light coupler which transfers the light with coupling mechanism such as diffraction or scattering into the light guide. Then in the light guide, the light travels in two (opposite) directions partly to the first end and partly to the second end of the light receptor where it is detected by the detection means, which are operable such that reference light arriving at each of both ends of the light receptor is separately detectable. Conduction of reference light impinging on the light receptor thereby comprises also that the impinging reference light is transformed by the light coupler into secondary light, for example using the principle of fluorescence (meaning phosphorescence, too). Such, not the reference light impinging on the light conductor itself is guided to the detectors and detected, but light that is generated in dependence of the impinging reference light; or in other words modified reference light is detected.

According to some embodiments of the invention, the light guide serves as a light propagation path of defined length for light coupled into the light guide by the light coupler. Preferably, the light guide is designed such that the light propagation is virtually lossless. Further, the signal processor determines the position based on propagation speed of the reference light propagating in the light guide. Said otherwise, the signal processor compares the detector signals at both ends of the one light propagation path defined by the light guide and evaluates a time difference between these signals whereby the difference is a result of different path lengths measured from the position where the reference light strikes the light receptor to the respective detector. The processor evaluates this difference in dependence of the light propagation speed of the light travelling in the light guide resp. along the light propagation path defined by the light guide and determines the relative position and/or orientation searched for thereof, considering the light propagation speed of the guided reference light. The light receptor comprising the light coupler and the light guide is position sensitive such that the signal (resp. its temporal properties) received at a respective detector is dependent on the position of impingement of the reference light.

In a first preferred embodiment, the signal processor is designed to determine the position and/or orientation based on a Time-of-Flight difference of light detected at both ends. In this embodiment, the invention makes use of the fact that different impinging positions along the direction of extent of the light receptor result in different path lengths to each end and thus the time necessary for the impinging light to travel with its propagation speed through the light guide to each end depends on the impinging position. In other words, the nearer the impinging position is to one end (resp. the detection means at the respective end), the shorter is the time necessary to travel to this detector, resulting in Time-of-Flight difference comparing the time of arrival at the two ends. Hence, using ToF allows for determination of a position relative to the reference light.

Alternatively or additionally, the signal processor is designed to determine the position and/or orientation based on a phase difference of light of modulated light or light pulses detected at both ends. In this embodiment, it is used that different impinging positions along the direction of extent of the light receptor result in different light phases at each end and thus the light phase detected at each end depends on the impinging position. Said otherwise, a different path length from the impinging position to one end results in a different phase at the respective end. Hence, using phase comparison and considering the light propagation speed allows for determination of a position relative to the reference light.

Preferably, the light guide is transparent for or guiding for light in the wavelength region of the light coupled in by the light coupler i.e. for the reference light as emitted by a reference light emitter or for reference light modified by the light coupler. "Transparent" means that the light guide shows very little attenuation for the wavelength of the reference light or light derived from the reference light. Additionally or alternatively it is preferred that the light guide is designed as a multimode or singlemode optical waveguide based on the principle of guided waves or as a light pipe relying on total internal reflection. For example, the light guide is a fiber-optic light guide like a glass or quartz fiber-optic light guide or a polymer waveguide/light pipe. Such light guides are preferably produced by a drawing or extrusion process or casting resp. molding.

The light guide is in certain embodiments designed as two wave guides which are positioned parallel and adjacent to each other such that impinging reference light travels in the first waveguide (at least mainly) to the first end and in the second waveguide (at least mainly) to the second end of the light receptor. Preferably, the light receptor is designed such that it shows a preferred direction of coupling in of light for each waveguide whereby the resulting two preferred directions are anti-parallel to each other. Preferably, the light coupler is designed to couple reference light into the light guide using the principle of diffraction, refraction, scattering, reflection, dispersion and/or fluorescence. In preferred embodiments, the light coupler is designed as microstructures embedded on a surface of the light guide, optionally designed as optical scattering centres or as diffraction gratings. Alternatively or additionally, the light coupler is designed as scattering particles. As a further option, the light coupler is designed as a rod with multiple reflecting surfaces, whereby the rod comprises at least two groups of reflecting surfaces of different orientation, or designed as a polymer waveguide integrated in a flexible print. Alternatively or additionally, the light coupler is designed as fluorescent (or phosphorescent) particles, e.g. in solid form or dispersed in a solution—e.g. as a fluorescently doped liquid within a hollow waveguide-, wherein the fluorescent material is designed to absorb reference light and in consequence to emit light to a different solid angle than the incident light or emit light omnidirectionally, whereby preferably the emitted light is of a wavelength different to that of the reference light (wavelength shift). Optionally, the dispersive and/or fluorescent particles are situated only on the surface or in the outer walls of the light guide. As another option, the fluorescent material is dispersed throughout the whole light guide or throughout a wider core zone of the light guide. As a further option, the light coupler is sensitive to light in the near-IR or with a wavelength in the visible range, for example a wavelength of 532 nm, 633 nm, or 650-690 nm, or —preferably for embodiments using fluorescence—with shorter wavelength, such as UV-light.

Optionally, the defined length of the light propagation path is at least 1 cm, preferrably at least 0.5 m, for example at least 2 m.

A further subject of some embodiments of the invention is the use of a light receiver according to the invention for determination of a position and/or orientation relative to a reference light.

Another subject of some embodiments of the invention is a position and/or orientation measuring system comprising a light emitter with a light source for directional emittance of light in form of a free light beam or light fan serving as a position reference. The light source is preferably a laser source, such as a laser diode, or a SLED (Superluminescent-LED). The emitter is for example embodied as a construction laser which emits a light beam in the free space whereby the light beam is continuously rotated in a fast manner about 360°, thereby defining for example a horizontal reference plane. The system further comprises a light receiver designed to determine a position relative to the reference light. The light receiver comprises an elongated rod-shaped light receptor with a light coupler, a light guide and light detection means designed to put out electric signals responsive to reference light separately detected at both ends.

According to some embodiments of the invention, the light guide serves as a, preferably virtually lossless, light propagation path of defined length for light coupled into the light guide by the light coupler. The defined length is preferably at least 1 cm. The measuring system determines the position and/or orientation by a comparative evaluation of the electric signals of both ends and based on propagation speed of the reference light. The position thereby is preferably a vertical offset, respectively an offset along the direction of the light guide, to a reference plane defined by the reference light.

Optionally, the light emitter of the measuring system is designed to emit pulsed light and the position is determined by the measuring system based on the principle of Time-of-Flight. Pulsed light may for example be generated by a pulsed light source of the light emitter or more generally by a intensity modulation of the emitted light (e.g. in cases of emitters with static laser planes). Another option is to use rotation of the light emitter with continuous wave such that by rotation of the light emitter relative to the light receiver light pulses are received by periodic impinging at the light receiver.

Additionally or alternatively, the light emitter is designed to emit harmonically modulated light and the position by the measuring system is determined based on the principle of phase difference.

Another subject of embodiments of the invention is a position and/or orientation determination method for determination of a position relative to reference light. The method involves the emittance of reference light in the form of a free light beam or free light fan and receiving at least part of the reference light with a light receiver comprising a light guide. The received light travels in the light guide in two opposite directions along a propagation path of defined length, wherein the defined length preferably is at least 1 cm. The received and guided light is detected at two (opposite) ends of the propagation path, which results in at least two detection signals. These two detection signals are used to determine the position and/or orientation based on propagation speed of the reference light, preferably using the measuring principle of Time-of-Flight and/or the measuring principle of phase difference.

A further subject of some embodiments the invention is a computer program product having program code which is stored on a machine-readable carrier or embodied as an electromagnetic wave, the program code being configured to control and carry out the method for position and/or orientation determination according to the invention.

Some embodiments of the present invention provide advantageously an improved light receiver for determination of a position and/or orientation relative to a reference provided by specifically shaped light emitted by a referenced light emitter. The improved light receiver enables position and/or orientation determination with high precision and thereby has a slimmer and less complex structure than devices of the state of the art. The present invention is applicable for different sorts of reference light, such as pulsed light and/or modulated light. As the signal processing is not based on comparison of amplitudes of detected light pulses resp. relies not (directly) on the strength of the detected light signals, the position determination according to the present invention is more precise compared to devices of the state of the art and/or works with relatively weak signal strengths, too, resulting in a higher sensitivity and lower demands on SNR. Thus, the measurement range or leveling distances can be extended resp. the emittance power of the reference light can be reduced for ordinary measurement range with advantages in form of power consumption and safety issues. The present light receiver enables further an improved transfer of received light to the detectors and allows for greater detection windows and thus for position determination in a wider space.

BRIEF SUMMARY OF THE DRAWINGS

The device according to the invention and the method according to the invention are in this case furthermore described in greater detail purely by way of example below on the basis of concrete exemplary embodiments illustrated schematically in the drawings, further advantages of the invention also being discussed. Specifically in the figures:

FIG. 3: shows a cross-sectional view an example of the position determination according to the invention;

FIGS. 5a-d: show views of a part of the light receiving part showing partly the light coupler and the light guide, and FIG. 6a,b: further embodiments of parts of a light receiver 1.

DETAILED DESCRIPTION

Figure 1A:
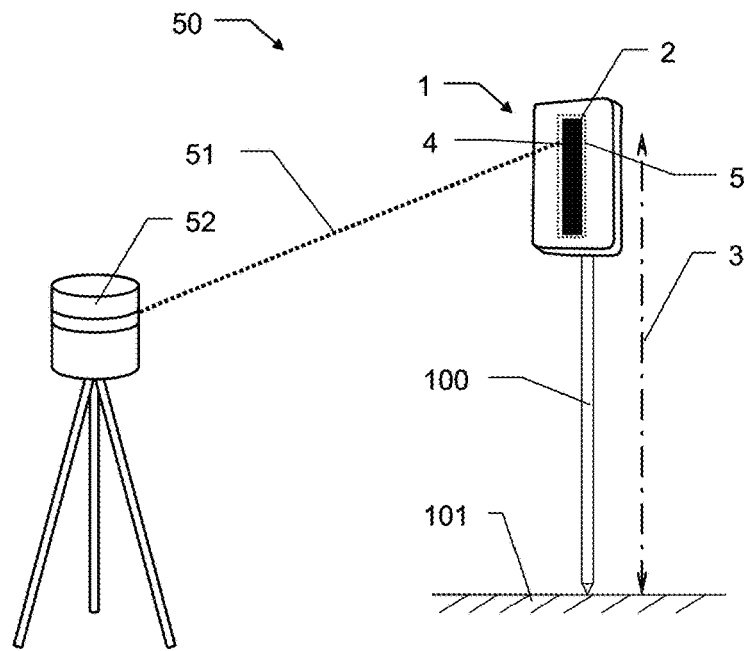
FIG. 1a,b: show exemplary measuring systems according to the invention.

FIG. 1a shows an exemplary measuring system 50 according to the invention. In the example, the measuring system 50 is used for concrete working, where a plane concrete surface 101 has to be built, such as a building's ceiling. The system comprises a light emitter 52, e.g. a construction laser, that emits a laser light beam 51 of a light source such a as a laser source or SLED with a well defined direction of emittance as reference light, thus serving as a position reference. In the example, the direction of emittance is strictly horizontal. The system 50 further comprises a light receiver 1 spaced apart from the construction laser 52 for receiving the reference light 51 and determine a position thereof. The light receiver 1 comprises a light receptor 2 arranged on a support 100 of defined length and a signal processor (not shown) for processing signals of the light receptor 2. The signal of the light receptor 2 varies with the impinging position 4 of the reference light 51 and hence the position 3 of the light receiver 1 relative to the reference light 51. The signal processor is designed to determine the impinging position 4 and thereof the relative position 3 from the receptor signal, as will be explained in detail below. Thus, one can check whether the surface 101 is plane i.e. if the impinging position 4 or the relative position 3 is the same throughout the whole surface 101. Based on the same principle, also the orientation can be referenced, e.g. with a light receiver 1 equipped with a second light receptor (not shown) with a known relative position to the first light receptor 2 (for example parallel to the first receptor 2 with a known distance in between). Commonly, not only the direction of emittance of the reference light 51 is well known, but the (absolute) height of the emitter 52, too. Thus, the (absolute) height of the laser receiver 1 can be determined from its relative position. If the laser beam 51 is not emitted purely horizontally, the distance between the light emitter 50 and the light receiver 1 is determined and considered in the position determination process, too. As shown, in many cases of use, the laser receiving part 2 is attached to a leveling rod 100 or to machinery which has to be leveled (see also FIG. 1b). The point of intersection of a laser beam or laser plane at the reception window 5 of the receiver 1 is determined by measuring the striking position of the beam's optical axis 51 within the receiving window 5. This position 4 is indicated to the user, in particular as a deviation from a desired striking position at the desired leveling position.

Figure 1B:
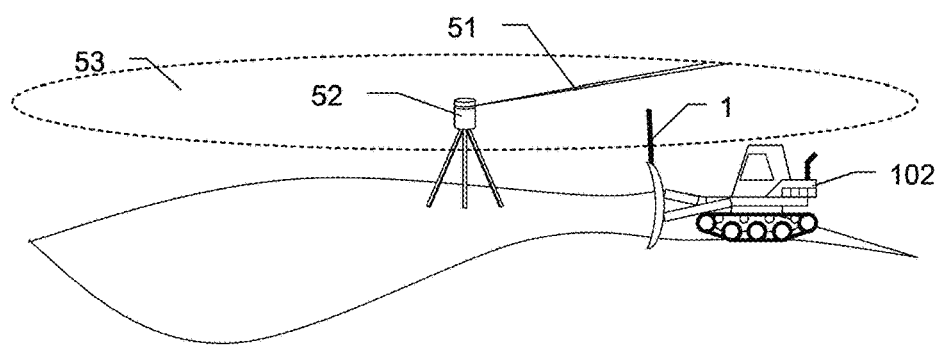

The light receiver 1 according to the invention has advantageously a simple structure and enables a relatively big or long detection window 5, which is particularly advantageous in long-range applications as shown in FIG. 1b.

FIG. 1b shows a second exemplary leveling application with the system 50 according to the invention, wherein a laser rotator 52 is emitting a light beam 51 spanning a leveling or reference plane 53 for the dozer 102 which is equipped with a laser receiver 1 according to the present invention. With the help of the measuring system 50, the dozer 102 is enabled to determine continuously its position relative to the position reference defined using the reference light 51, for example its vertical offset to the reference plane 53. In the case of an absolute referenced laser rotator 52, the dozer 102 can finally determine its absolute position. Because of the long distance between the emitter 52 and the receiver 1, which amplifies uncertainties of the leveling plane 52 (e.g. its orientation) and because of surface bumps which can lead to a considerable change of the horizontal position of the dozer 102, a large (vertical) detection window as provided by the present invention is advantageous. The detection window according to the present invention is at least 1 cm, preferably at least 0.5, or for use cases as described above 2 m or more. Particularly advantageous for this application is a wide horizontal angular reception field of view, which can be facilitated by a light guide—even up to 360°.

Figure 2:
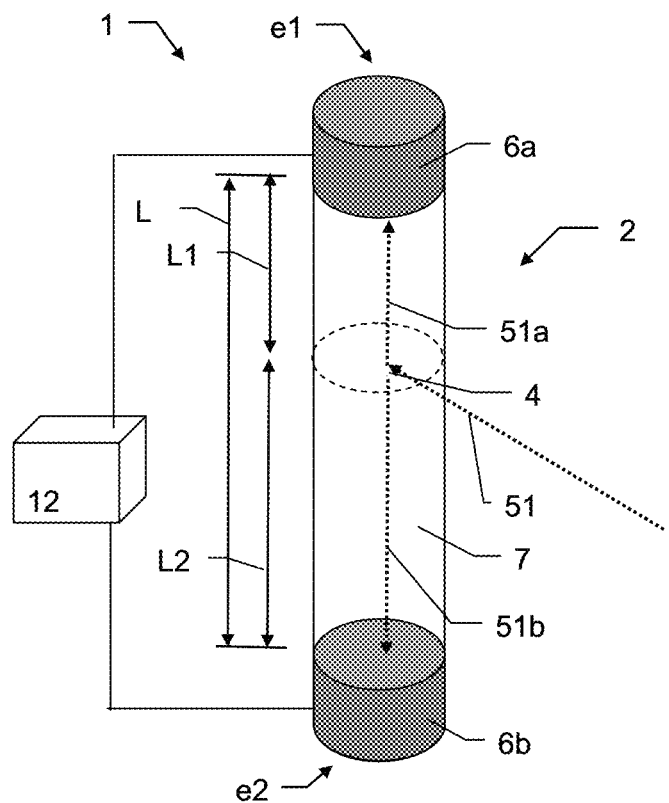
FIG. 2: shows a 3D-view of an embodiment of a light receiver according to the invention.

FIG. 2 shows in a purely schematic 3D-view an exemplary embodiment of a light receiver 1 according to the invention in detail. The light receiver 1 comprises an elongated rod-shaped light receiving part or light receptor 2 with two ends e1 and e2, a light coupler (not shown for a better clearness), a light guide 7 and two light detectors 6a and 6b at each end e1, e2. The light detectors 6a and 6b are connected to a signal processor 12 of the light receiver 1 which processes the electric signals of the detectors 6a and 6b separately generated responsive to detection operations of reference light 51 detected at each end e1, e2. Alternatively to the straight form of the light receptor 2 as shown, the rod 2 is convoluted, for example in form of the letter "U" such that both ends e1 and e2 lie on the same side which allows simplified electric connection to the processor 12 for example through a printed circuit board. Further advantages of such embodiments are better signal integrity due to short electrical interconnects, a tight thermal coupling which helps improving accuracy trough lower temperature drift (especially advantageously for APD's) and the fact that each impingement results in two symmetrical pulses on both detectors, resulting in a more robust detection and reduction of temperature effects. Additionally, the use of a single detector 6a coupled to both ends is simplified in such embodiments compared to the use of a single detector 6a detecting light at each end in embodiments with a straight form.

The light guide 7 defines a light propagation path of defined length L. Reference light 51 impinging on the light receiving part 2 at a impinging position 4 is coupled into the light guide 7 by the light coupler and travels along the light propagation path L (for reasons of simplicity the notation "L" is used both the path and its length) to each end e1 and e2. Thus, the whole light propagation path L is divided by the impinging position 4 in two parts L1 and L2, whereby one part of the received reference light 51a travels along the "upper" path L1 to the "upper" end e1 and another part of the received reference light 51b travels along the "lower" part L2 to the "lower" end e2. In other words, the impinging position 4 divides the propagation path L in two path parts L1 an L2. As the whole path length L is well known, the signals detected at both ends e1 and e2 hence allow for determination of the impinging position 4. In the present example, the light path L1 is shorter than the light path L2, whereby the difference is dependent on the impinging position 4. Because of the different path lengths L1 and L2, the signals of the "upper" light detector 6a at the "upper" end e1 and of the "lower" light detector 6b at the "lower" end e2 are not identical, but differ somehow from each other, whereby the difference of the signals is likewise dependent on the impinging position 4. Hence, through a comparative evaluation of the electric signals of both detectors 6a and 6b resp. of both ends e1 and e2 by the processor 12, the impinging position 4 can be determined and thereof the position relative to the position reference defined by the reference light 51 resp. by the light emitter. According to the invention, the signal processor 12 determines the position based on the light propagation speed of the reference light 51 propagation in the light guide 7.

FIG. 3 illustrates in a cross-sectional view an example of the position determination according to the invention. Reference light 51 arrives at the light receiving part 2 at position 4. The light coupler 8—which in the example is situated such that it forms an outer wall of the light receptor 2 around the light guide 7 in the interior respectively forms cladding of the waveguide or is narrowly spaced to it—couples at least part of the light into the light guide 7. The received light travels in both directions in the light guide 7, which is guiding in the wavelength region of the received light, serving as a light propagation path L, whereby one part of the received light 51a propagates in the light guide 7 to the first end e1 resp. first detector 6a and another part to the second end e2 resp. second detector 6b. The light guide 7 is for example a fiber-optic light guide such as a glass or quartz or polymeric optical fiber.

The reference light 51 in the example is temporally modulated, consisting of a train of short pulses, for example with a pulse duration of less than 10 ns. Alternatively, the reference light can be modulated sinuously with a frequency around 10 MHz to 100 MHz. The first detector 6a then detects part of the light 51a of a light pulse and gives out a first detection signal S1 at time t1, the second detector detects another part 51b of the light of the same light pulse and gives out a second detection signal S2 at time t2. As both light parts 51a and 51b have the same light propagation speed c/n, wherein n is the effective refraction index of the light guide 7, and due to the shorter propagation path for the first received light 51a, the time t1 differs from t2 (the "upper" light pulse arrives at the detector before the "lower" light pulse), resulting in a time difference T of the reception of light at the respective ends resp. of the output of the detection signals S1 and S2. The time difference T varies dependent on the position 4 of the incident reference light 51. Signal detection is for example done using well known sampling techniques or threshold techniques. The light receiver 1 preferably comprises a time-of-flight circuitry with a timing resolution corresponding to millimeter range or even better. Further, it comprises a time base to read out the two light detectors 6a, 6b with the required timing precision, a signal processing unit, a calibration unit, an interface to send out the data and/or a visual indicator or display to show the difference between the actual position and the reference position (not shown).

Hence, this time difference T is determined by by a time measurement unit for example consisting of a precision clock, a counter and a time interpolation unit implemented in a FPGA. The ranging system is controlled by the signal processor. The position 4 is determined as the product of the time difference T and the light propagation speed c/n of the light guide 7, divided by 2: $cT/(2n)$ (in the example the position 4 is measured from the middle M of the light guide 7).

Alternatively or in addition to position determination using a Time-of-Flight method as described above, the position determination is based on light propagation speed of the received light 51a, 51b in another way, using a phase difference of the signals S1 and S2 detected at each end e1 and e2. The Time-of-Flight method used here is comparable to the phase-difference method for measuring distance with sub-millimeter precision. For using a phase difference, the reference light 51 is harmonically modulated light, i.e. the intensity I(t) as a function of time t is given by $I(t)=I0+A\times \sin(2\pi ft)$, where f indicates the modulation frequency, A the modulation amplitude and I0 the background and/or offset light level (whereby $I0 \geq A$). By measuring the phase difference $\Delta\Phi$ between the two harmonic signals produced at photodetectors 6a and 6b with the signal processor, using e.g. a phase shift detector, it is possible to calculate the position 4 of incident light 51 with respect to the middle M of the light guide 7 from $c\Delta\Phi/(4\pi fn)$.

Measuring the phase shift between two harmonic signals with the signal processor can be accomplished in several ways. If the electrical signal level is high enough, a direct lock-in detection technique can be employed, where one of the signals produced by photodetectors 6a or 6b is used to extract a reference clock signal for the demodulation of the signal of the other detector 6b or 6a. A second preferred method uses a reference light emitter such that it emits a radio-frequency signal of the same frequency as used for the modulation of the emitted reference light 51. The signal processor receives this RF signal and uses it for the demodulation of both signals produced by photodetectors 6a and 6b, making use of known lock-in detection and demodulation techniques. A third preferred method consists of sampling both signals at a fixed sampling frequency that is at least twice the maximum frequency of the modulated reference light 51. Both digitized signals are then Fourier-transformed, and in both Fourier transforms the frequency of maximum amplitude is determined through interpolation. For both frequencies, the corresponding phase shifts are determined. The difference $\Delta\Phi$ of these two phase shifts is then used as described above to calculate the position 4 of incident light 51 with respect to the middle M of the light receiver using the above equation.

Figure 4B:
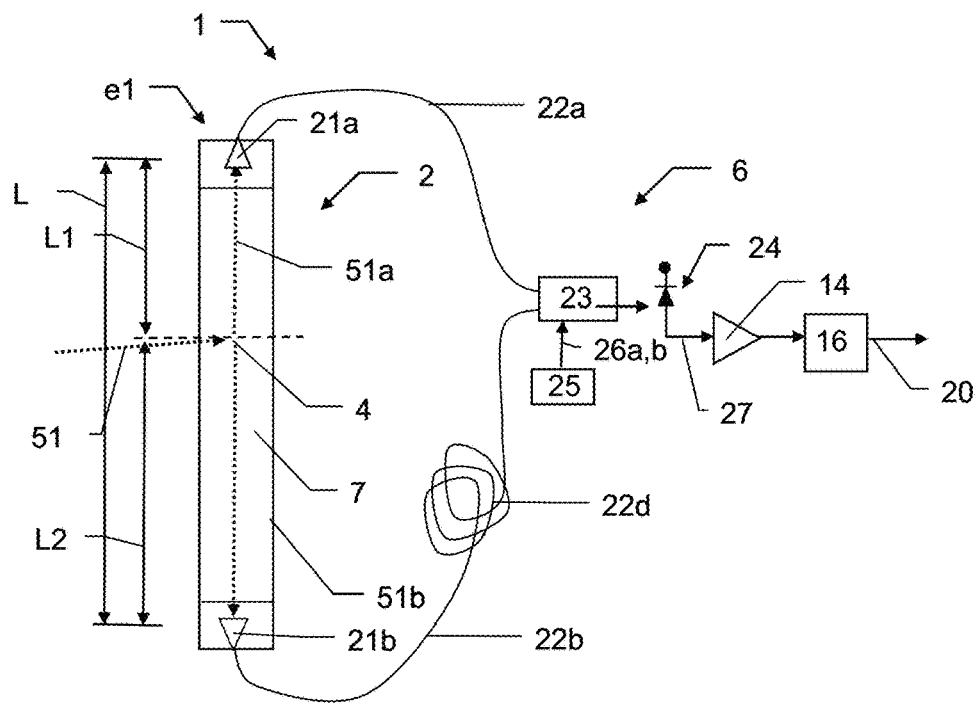
FIG. 4a,b: two examples of a light receiver 1.

FIGS. 4a and 4b show two examples of a light receiver 1, illustrating the signal treatment in more detail. The position or length 3 has to be determined. In the case that the end-tip of the support 100 is the reference point and attached to the end e1, then length 3 corresponds to the sum of support 100 and the length L1 (cf. FIGS. 1a and 2). The length L1 can be deduced from the length L and the measured difference (L1−L2) divided by two. Finally the impinging position 4 is known. Because it is not necessary to measure the length L1 and L2 separately but only their differences makes timing circuitry and calibration much easier. The difference (L1−L2) can directly be measured by the time difference between the two signals received at ends e1 and e2, irrelevant of a missing synchronization of the clock of the emitter and the clock of the time-of-flight or phase-difference measurement unit. The events t1, t2 at ends e1 and e2 act like a start and a stop trigger.

FIG. 4a shows an embodiment of the invention based on a distance measurement unit comprising two signal channels 13a, 13b. At each end e1, e2 the radiation coupled in by the light coupler (not shown) and guided to the respective end e1, e2 by the light guide 7 is detected by high speed photo-sensors 6a, 6b. Their signals are processed by the signal processor 12, wherein they are amplified by assigned electronic circuitries 14 and fed into a time measurement ASIC (TOF or phase meter) as for example used in hand-held distance meters (see FIG. 4b). Alternatively the amplified signals also can be fed into a common FPGA 19 as shown in FIG. 4a which operates as two combined time-of-flight units. The submodules inside the FPGA are threshold discriminators 15 and time-to-digital converters (TDC) 16, which measure the time of the events by interpolation the time intervals of a precision master-clock 18 which acts as the time base for both time measurement units together. These time-measurement circuitries are well known to the experts in the field. The two TDCs 16 measure the time t1, t2 of the two events acting like trigger pulses and the difference (L1−L2) is the time difference 20 (t2−t1) calculated by the time difference calculation unit 17 multiplied by the effective speed of light inside the light guide 7.

FIG. 4b shows an alternative embodiment of the invention consisting of a single time-of-flight distance measurement unit. In this case the optical signals 51a, 51b at each end e1, e2 are fed into optical fibers 22a, 22b by light collector and fiber-coupling units 21a, 21b and guided to an optical combiner 23 such that both optical signals 51a, 51b arrive at a single photodiode 24, where they are detected separately (i.e. independently from each other) in two separate detection operations. Thus downstream there is only one electronic signal path 27. The photo-electronic signal is amplified by amplifier 14 and given into a time measurement unit 16 which puts out the time difference 20. The time measurement unit 16 is for example a time measurement ASIC or a waveform digitizer comprising a high-speed ADC for digitizing the received signal pulses and an FPGA for signal processing and determining the time interval between the two pulses. In order to identify the two arriving optical pulses 51a, 51b (and to ensure separate light detection operations) the time delay between the two fibers 22a and 22b must be longer than the active rod length L. When using optical fibers 22a, 22b, 22d the realization of a delay line 22d is simple and the length L of the light receptor 2 can be of several meters.

Potential temperature drifts can be calibrated by test pulses 26a, 26b, generated by a calibration light source 25 such as a calibration LED or laser source. Such test pulses 26a,b can be realised by built-in LEDs inside the light receptor 2 in the center, or somewhere within the length L, or at both ends e1, e2. Illustrated is an external LED 25 which radiates the optical fibers upstream. The two revolving signals responsive to the light pulses 26a,b are detected and processed like normal received signals. The measured time difference of these two artificial calibration signals can be used for absolute calibration of the light receiver.

FIGS. 5a-d are views of a part of the light receiving part showing partly the light coupler 8 and the light guide 7 of different embodiments according to the invention.

Figures 5A, 5B:
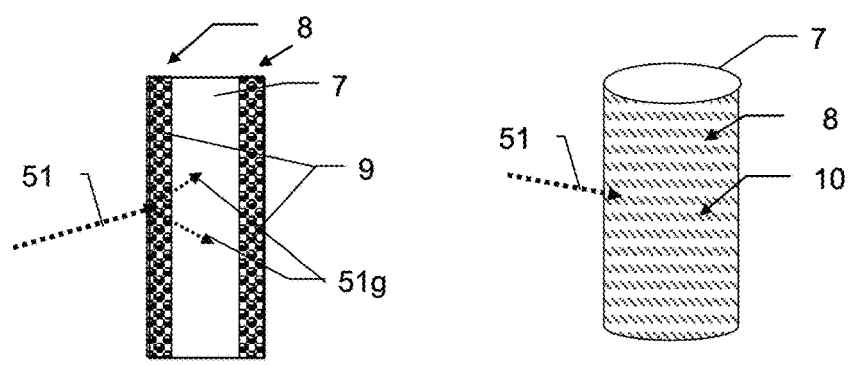

In the cross-sectional view of FIG. 5a, the light guide 7 is embodied as a transparent rod in which light coupled in can travel virtually lossless, for example through total reflection on the boundary of the light guide 7, which may be embodied as a light fiber but also as a hollow tube with reflecting walls. "Virtually lossless" means that attenuation may occur, but is quite low such as in fiber optics, and much lower (e.g. in the order of magnitudes) than in light guides of the state of the art that are based on the principle of dispersion (in the sense of scattering). The light guide 7 is coated by the light coupler 8, which in the example comprises a plurality of dispersive particles 9. The dispersive particles 9 serve a light-scattering centers, scattering reference light 51g in multiple directions, therefore coupling at least some part of the incident reference light 51 into the light guide 7. Therefore, the light coupler 8 and the light guide 7 interact to receive and conduct at least part of the reference light 51 to the detectors at both ends. Alternatively to a coating of particles 9, the particles are arranged in the outer wall of the light guide 7 or throughout the whole light guide 7 and generating scattered light 51g there. In the latter case, an upper density limit of scattering particles 9 is employed such that the propagation of coupled light 51g in the light guide 7 is not essentially disturbed.

FIG. 5b shows in a 3D-view another embodiment of light guide 7 and light coupler 8. In this example, the light guide 7 has microstructures 10 on its surface which act as optical scattering centres and/or as diffraction centres, thus forming the light coupler 8 which couples reference light 51 impinging on the surface of the light guide into the interior of the light guide 7 by scattering and/or diffraction of the incident reference light 51. Hence, in this embodiment, no additional material or particles is needed to build the light coupler 8 but modification of the (surface) structure of the light guide 7 itself provides the light coupler 8.

FIG. 5c shows in a cross-sectional view a further embodiment of light guide 7 and light coupler 8. Here, fluorescent (and/or phosphorescent) particles 11 are deployed in the outer wall of the light guide 7—in solid state or optionally dispersed in a liquid—or build a separate coating of the light guide 7. The particles 11 are receptive for the reference light 51 resp. for the wavelength of the reference light 51. Hence, the fluorescent layer absorbs (at least part of) reference light 51 of a first wavelength. The fluorescent layer emits then in multiple directions (or rather omnidirectional) and to a different solid angle than the incident light 51 light 51g of a second wavelength different to the first one, for example of a shorter wavelength as symbolized in FIG. 5c.

Examples of such fluorescent materials include the Alexa Fluor and the DyLight fluorescent dyes specified for example in the Thermo Scientific Pierce Fluorescent Products Guide entitled "Fluorescent labeling and detection", published in 2012 by Thermo Fisher Scientific Inc. Considering the popular wavelength of 633 nm produced either with a HeNelaser or a laser diode, fluorescent dye DyLight 633 would be appropriate, with an absorption maximum wavelength of 638 nm and an emission maximum wavelength of 658 nm.

Using fluorescent particles 11 is particularly advantageous if they are not only disposed around the light guide 7 or in the outer areas of the light guide 7 but throughout its interior or in a core area of the light guide 7. As the fluorescent particles 11 emit light 51g with a wavelength for which absorption is much weaker than for the incident reference light 51, the fluorescent particles 11 do not (or at least only at a low degree) hinder or weaken the propagation of the light 51g coupled in through the light guide 7. Therefore, unlike scattering or diffracting particles as mentioned in FIG. 4a, an upper density limit for the fluorescent particles 11 does not (or at least to a much lower extent) have to be observed. Or seen the other way round the use of fluorescence enables a long receiving part and thus a large detection window also when coupling particles 11 are dispatched throughout the interior of the light guide 7.

Dispatching coupling material not only on or in the outer part of the light guide 7 has some advantages in relation to yield of transfer of impinging reference light 51 into the light guide 7 as for example a thicker coupling layer can be realised compared to a coating or outer wall area. Generally, the use of a light receiving part according to the invention may result in a lower yield of light coupling compared to solutions of the state of the art but the losses of light 51g coupled in resp. of light 51g travelling in the light guide 7 is advantageously strongly reduced as virtually no coupling out of the guided light 51g takes place.

As seen in the example of FIG. 5c, in the sense of the present invention the term "reference light" comprises not only the reference light 51 itself resp. its direct use for detection, but comprises also secondary light 51g generated from the impinging reference light 51 for example as shown by fluorescence.

FIG. 5d shows in a cross-sectional view a further embodiment of light guide 7 and light coupler 8. In this embodiment, the outer wall 28 forms a hollow cylinder 31 and is transparent for incident reference light 51. In the middle of the hollow cylinder 32, there is a reflective metal cylinder 32 with an uneven surface as shown in more detail in a zoomed view on the right of FIG. 5d. The metal cylinder 32 comprises in this exemplary embodiment small truncated pyramids or cones 30 with mirror surfaces 29. Alternatively or additionally, the metal cylinder 32 has a grooved surface. Incident light 51 then is scattered resp. reflected in "top" direction towards the first end as well as in "bottom" direction towards the second end in an interaction with the outer wall 28 using the principle of total reflection.

FIG. 6a shows in a 3D-view a further embodiment of (parts of a) light receiver according to the invention. The light receiver comprises sheets of flexible print 33 with polymer waveguides 22 integrated in the prints 33. Such flexible prints 33 are manufactured by vario-optics AG (Switzerland). These prints 33 serve as light coupler 8 and light guide 7 for incident reference light 51, guiding it towards both ends e1 and e2 to the detectors 6a and 6b, for example embodied as APDs.

FIG. 6b shows in a cross sectional view a further embodiment of (parts of a) light receiver according to the invention. Impinging reference light 51 is coupled in and guided as guided light 51g towards both ends e1, e2 (the light propagation path of the guided light 51g is much simplified in the FIG. 6b). At each end e1, e2, the light receptor 2 comprises a combined (spectral) bandpass (such as a interference filter) and diffuser 35. At each end e1, e2, light 51g travels from the diffuse surface of the diffuser 35 to a lens 34 where it is collimated on the respective detector 6a, 6b.

What is claimed is:

1. A light receiver for determining a position or orientation relative to a reference light in form of a free light beam or light fan, the light receiver comprising:
    an elongated rod-shaped light receptor with two ends;
    a light coupler;
    a light guide; and
    a light detection means,
    wherein the light coupler and the light guide are configured to receive and conduct at least part of the reference light impinging on the light receptor towards both ends such that impinging reference light is detectable at both ends by the light detection means,
    wherein the light detection means is configured for separate light detection operations of reference light arriving at each of both ends of the light receptor and to generate electric signals responsive to reference light separately detected at each end,
    wherein the light receiver further comprises a signal processor to process the electric signals and to determine the relative position or orientation of the reference light by a comparative evaluation of the electric signals of both ends,
    wherein the light guide serves as a light propagation path of defined length for light coupled into the light guide by the light coupler, and
    wherein the signal processor determines the position or orientation of the reference light based on light propagation speed of the reference light propagating in the light guide.

2. The light receiver as claimed in claim 1, wherein the position is specifying a vertical offset to a reference plane defined by the reference light.

3. The light receiver as claimed in claim 1, wherein the signal processor determines the position or orientation based on a Time-of-Flight difference of light detected at both ends.

4. The light receiver as claimed in claim 1, wherein the signal processor determines the position or orientation based on a phase difference of light detected at both ends.

5. The light receiver as claimed in claim 1, wherein the light guide is configured for guiding light in the wavelength region of the light coupled in by the light coupler, or is designed as a multimode or singlemode optical waveguide based on the principle of guided waves or as a light pipe relying on total internal reflection.

6. The light receiver as claimed in claim 1, wherein the light coupler is designed to couple reference light into the light guide using diffraction, refraction, scattering, reflection, dispersion or fluorescence.

7. The light receiver as claimed in claim 1, wherein the light coupler is configured as one of:
    microstructures embedded on a surface of the light guide;
    scattering particles;
    rod with multiple reflecting surfaces, whereby the rod comprises at least two groups of reflecting surfaces of different orientation;
    polymer waveguide integrated in a flexible print; or
    fluorescent particles, wherein the fluorescent material is designed to absorb reference light and to emit light of the same wavelength or a wavelength different to that of the reference light and to a different solid angle than the incident light.

8. The light receiver as claimed in claim 1, wherein the light detection means comprises at least one of Photomultiplier Tube, Avalanche Photo Diode, PIN-Diode, Multi-Pixel Counter or Single Photon Avalanche Diode.

9. The light receiver as claimed in claim 1, wherein the defined length of the light propagation path is at least 1 cm.

10. A position or orientation measuring system, the system comprising:
    a light emitter with:
        a light source for directional emittance of light in form of a free light beam or light fan serving as a position reference, and
        a light receiver designed to determine a position or orientation relative to the reference light, wherein the light receiver comprises:

an elongated rod-shaped light receptor with two ends, a light coupler, a light guide, and a light detection means designed to put out electric signals responsive to reference light separately detected at both ends, wherein the measuring system determines the relative position or orientation by a comparative evaluation of the electric signals of both ends, wherein the light guide serves as a light propagation path of defined length for light coupled into the light guide by the light coupler, and wherein the measuring system determines the position, based on light propagation speed of the reference light propagating in the light guide.

11. The measuring system as claimed in claim 10, wherein the light emitter is designed to emit pulsed light and the position or orientation is determined based on the principle of Time-of-Flight.

12. The measuring system as claimed in claim 10, wherein the light emitter is designed to emit harmonically modulated light and the position or orientation is determined based on the principle of phase difference.

13. A position or orientation determination method for determination of a position or orientation relative to reference light, the method comprising:

emitting of reference light in the form of a free light beam or free light fan;

receiving at least part of the reference light with a light receiver comprising a light guide, wherein received light travels in the light guide in two opposite directions along a propagation path of defined length;

detecting of the received and guided light at two ends of the propagation path, resulting in detection signals of both ends; and determining of the position or orientation based on comparative evaluation of the detection signals of both ends and light propagation speed of the reference light propagating in the light guide.

14. A computer program product having program code which is stored on a machine-readable medium the program code being configured to control and carry out the position determination method according to claim 13.

* * * * *